United States Patent
Rodriguez et al.

(10) Patent No.: US 8,850,043 B2
(45) Date of Patent: Sep. 30, 2014

(54) NETWORK SECURITY USING TRUST VALIDATION

(75) Inventors: Ricardo J. Rodriguez, Palmetto, FL (US); Mark Volpe, Largo, FL (US)

(73) Assignee: Raytheon Company, Waltham, MA (US)

(*) Notice: Subject to any disclaimer, the term of this patent is extended or adjusted under 35 U.S.C. 154(b) by 674 days.

(21) Appl. No.: 12/756,514

(22) Filed: Apr. 8, 2010

(65) Prior Publication Data

US 2010/0262706 A1    Oct. 14, 2010

Related U.S. Application Data

(60) Provisional application No. 61/168,444, filed on Apr. 10, 2009.

(51) Int. Cl.
*G06F 15/16* (2006.01)
*H04L 29/06* (2006.01)
*H04L 9/32* (2006.01)

(52) U.S. Cl.
CPC .............. *H04L 63/101* (2013.01); *H04L 63/10* (2013.01); *H04L 9/3234* (2013.01); *G06F 2211/009* (2013.01)
USPC ............... 709/229; 726/2; 709/250; 709/242; 713/155; 713/166

(58) Field of Classification Search
CPC ..... H04L 63/101; H04L 63/10; H04L 9/3234; G06F 2211/009
USPC ........................... 709/229, 242; 713/155, 166
See application file for complete search history.

(56) References Cited

U.S. PATENT DOCUMENTS

| | | | |
|---|---|---|---|
| 7,565,433 B1 * | 7/2009 | Lamport | 709/227 |
| 7,620,680 B1 * | 11/2009 | Lamport | 709/201 |
| 8,107,397 B1 * | 1/2012 | Bagchi et al. | 370/254 |
| 2004/0025018 A1 * | 2/2004 | Haas et al. | 713/168 |
| 2004/0158723 A1 * | 8/2004 | Root | 713/186 |
| 2006/0217976 A1 * | 9/2006 | Gao et al. | 704/233 |
| 2007/0101400 A1 * | 5/2007 | Freeman et al. | 726/2 |
| 2008/0084294 A1 * | 4/2008 | Zhiying et al. | 340/539.22 |
| 2009/0006597 A1 * | 1/2009 | Bade et al. | 709/223 |
| 2009/0216910 A1 * | 8/2009 | Duchesneau | 709/250 |

OTHER PUBLICATIONS

Lamport et al. The Byzantine Generals Problem, Sep. 2004, pp. 1-22.*
Rajendran et al., "Secure Anonymous Routing in Ad Hoc Networks," © 2008 ACM ISBN 978-1-59593-950-0/08/01, 2008.

(Continued)

*Primary Examiner* — Arvin Eskandarnia
(74) *Attorney, Agent, or Firm* — Cantor Colburn LLP

(57) ABSTRACT

In certain embodiments, a method includes receiving a communication session request from a requesting node. The communication session request is received via a network facilitating communication among a number of nodes. A number of trust level values associated with the requesting node are accessed. Each of the number of trust level values is received from one of the number of nodes. The method further includes determining, based on a voting technique and the accessed trust level values associated with the requesting node, a validated trust level associated with the requesting node. The method further includes determining, based on the validated trust level associated with the requesting node, whether to allow the communication session request received from the requesting node.

21 Claims, 2 Drawing Sheets

(56) References Cited

OTHER PUBLICATIONS

Chang et al., "A Dynamic Trust Metric for P2P Systems," Proceedings of the Fifth International Conference on Grid and Cooperative Computing Workshops (GCCW'06) 0-7695-2695-0/06 © 2006 IEEE, 2006.

Li et al., "A Secure Routing Protocol for Wireless Ad Hoc Networks," 0-7695-2507-5/06 © 2006 IEEE, 2006.

Fedotova et al., "Byzantine Generals Problem in the Light of P2P Computing," 0-7803-9792-4/06 © 2006 IEEE, 2006.

Herbert Gintis, "Game Theory Evolving, A Problem-Centered Introduction to Modeling Strategic Interaction," © 2000, 2000.

PCT, Notification of Transmittal of the International Search Report and the Written Opinion of the International Searching Authority, or the Declaration, International Application No. PCT/US2010/030464, Int'l filing date Apr. 9, 2010 (9 pages), Mailing Date Jan. 13, 2011.

\* cited by examiner

NETWORK SECURITY USING TRUST VALIDATION

RELATED APPLICATIONS

This application claims the benefit under 35 U.S.C. §119(e) of the priority of U.S. Provisional Application No. 61/168,444, filed Apr. 10, 2009, entitled "Secure Ad Hoc Communication Network."

TECHNICAL FIELD

This disclosure generally relates to network security and more particularly to network security using trust validation.

BACKGROUND

Ad hoc networks generally include multiple nodes configured to communicate with one another in a decentralized fashion. Ad hoc networks may be dynamically self-healing in that, in response to the loss of a node from the ad hoc network, communication traffic that would otherwise encounter the lost node is alternatively routed through other active nodes. As a result of this dynamic self-healing capability, ad hoc networks may be beneficial for applications involving multiple nodes, each of which join and leave the ad hoc network on an as-needed basis. The inherent decentralized nature of ad hoc networks, however, may result in a number of vulnerabilities that may be exploited by malicious entities (e.g., via false node attacks).

SUMMARY

According to the present disclosure, disadvantages and problems associated with previous techniques for providing ad hoc network security may be reduced or eliminated.

In certain embodiments, a method includes receiving a communication session request from a requesting node. The communication session request is received via a network facilitating communication among a number of nodes. A number of trust level values associated with the requesting node are accessed. Each of the number of trust level values is received from one of the number of nodes. The method further includes determining, based on a voting technique and the accessed trust level values associated with the requesting node, a validated trust level associated with the requesting node. The method further includes determining, based on the validated trust level associated with the requesting node, whether to allow the communication session request received from the requesting node.

Certain embodiments of the present disclosure may provide one or more technical advantages. For example, the trust determination tool of a node receiving a communication request may determine whether to allow the requested communication session based on a validated trust level associated with the requesting node. Because the validated trust level is determined based on trust level values obtained from each of the other nodes in the network, the validated trust level may be a more reliable indicator of the trustworthiness of the requesting node. As a result, the ability to compromise the security of the network through a single node may be reduced or eliminated. Furthermore, each node of the ad hoc network may be independently operable to perform the above-discussed trust validation procedure, which may reduce or eliminate the need for a centralized management structure for determining whether to allow requested communication sessions.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DESCRIPTION OF EXAMPLE EMBODIMENTS

Figure 1:
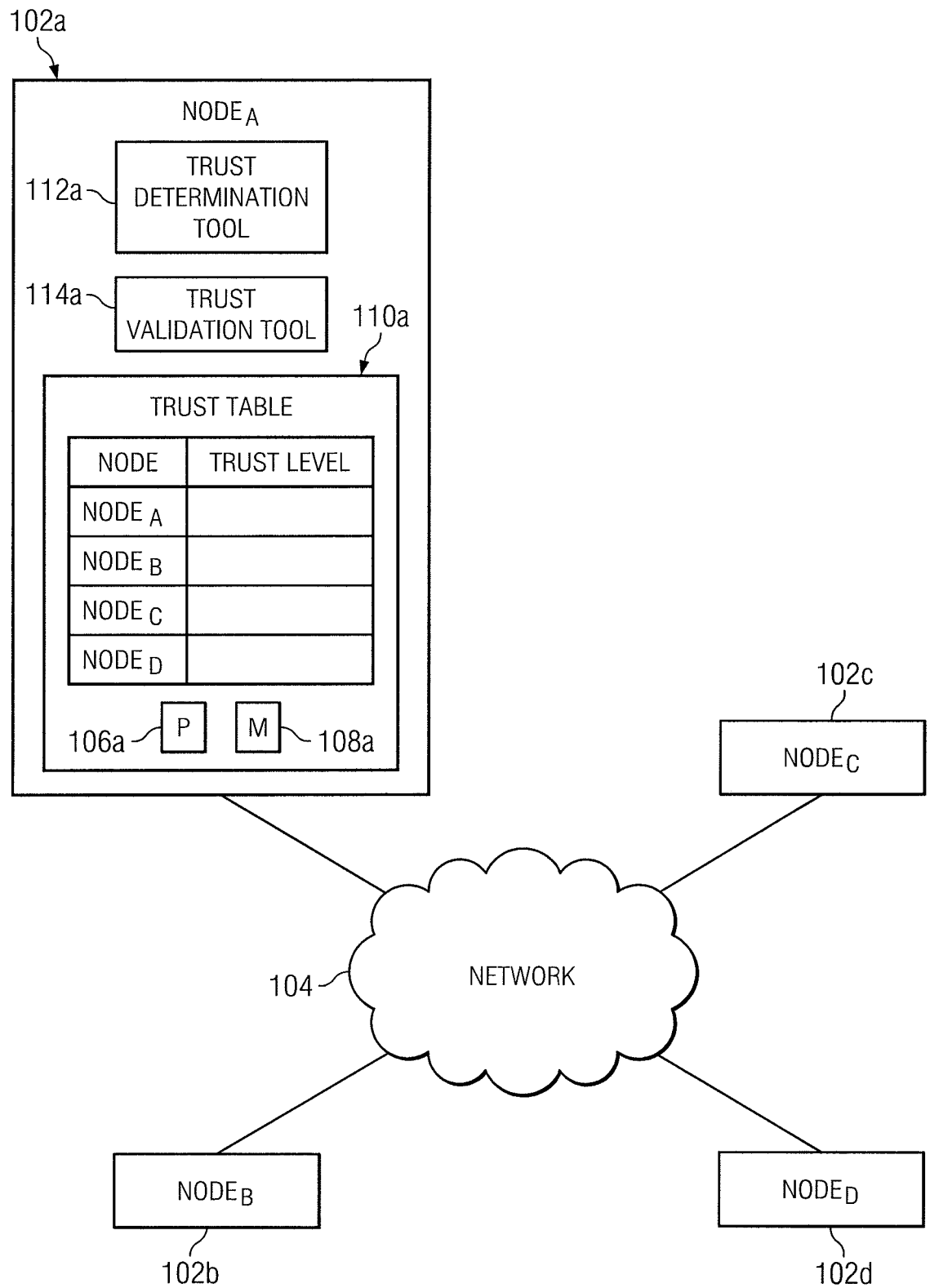
FIG. 1 illustrates an example system for providing network security using trust validation, according to certain embodiments of the present disclosure.

FIG. 1 illustrates an example system 100 for providing network security using trust validation, according to certain embodiments of the present disclosure. System 100 may include a plurality of nodes 102 (e.g., nodes 102a-102d), each node 102 being operable to communicate with one or more other nodes 102 via network 104. Although a particular implementation of system 100 including a particular number of nodes 102 is illustrated and primarily described, the present disclosure contemplates any suitable implementation of system 100 including any suitable number of nodes 102, according to particular needs.

In general, each node 102 of system 100, in order for the node 102 to determine whether to allow a communication session with another node 102 requesting the communication session, may be operable to determine a validated trust level associated with the other node 102. The validated trust level may be determined by applying a voting technique (e.g., applying the "3m+1" solution to the Byzantine Generals Problem) to trust level values associated with the node 102 requesting the communication session, the trust level values being accessed from the remaining nodes 102 of system 100. Because the validated trust level is determined based on trust level values obtained from each of the other nodes 102 in the network, the validated trust level may be a more reliable indicator as to the trustworthiness of the requesting node 102. As a result, the ability to compromise the security of the network through a single node 102 may be reduced or eliminated. In certain embodiments, the present disclosure may be well-suited for ad hoc networks.

Nodes 102 may each include any suitable connection point in a communications network, including communication redistribution points and/or communication endpoints. For example, nodes 102 may include any suitable combination of computer systems, server systems, modems, hubs, bridges, switches, and/or any other suitable device operable to communicate via network 104.

Network 104 may facilitate wireless or wireline communication. Network 104 may communicate, for example, IP packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2:
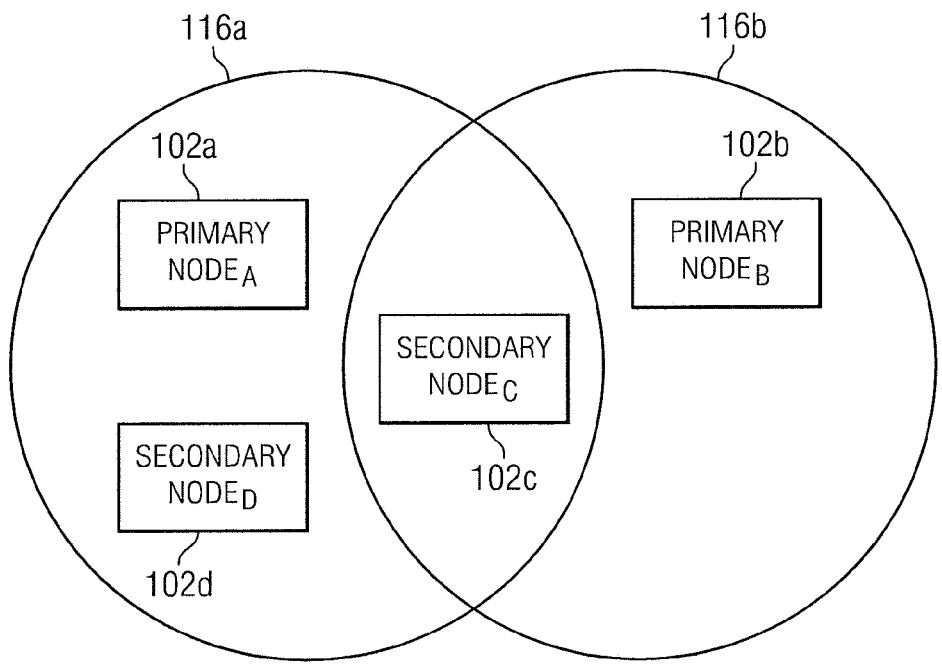
FIG. 2 illustrates an example primary/secondary distribution of nodes in the example system depicted in FIG. 1, according to particular embodiments of the present disclosure.

FIG. 2 illustrates an example primary/secondary distribution of nodes 102 of system 100, according to particular embodiments of the present disclosure. In certain embodiments, one or more nodes 102 may be primary nodes and one or more other nodes 102 may be secondary nodes. Secondary nodes 102 may be nodes 102 that are accessible via at least one primary node 102. In the example distribution illustrated in FIG. 2, nodes 102a and 102b are each primary nodes. Primary nodes 102a and 102b may have associated communication boundaries 116a and 116b, respectively. In certain embodiments, all secondary nodes 102 located within the communication boundary 116 of a particular primary node 102 may be accessible via the particular primary node 102. For example, secondary node 102d may be located within communication boundary 116a associated with primary node 102a; therefore, secondary node 102d may be accessible via primary node 102a. Additionally, secondary node 102c may be located within both communication boundary 116a associated with primary node 102a and communication boundary 116b associated with primary node 102b; therefore, node 102c may be accessible via either primary node 102a or primary node 102b.

In the example discussed throughout the remainder of this description, it is assumed that nodes 102a-102d are arranged according to the above-described primary/secondary distribution illustrated in FIG. 2. However, the present disclosure contemplates any suitable primary/secondary distribution of any suitable number of nodes 102, according to particular needs. Furthermore, the present disclosure contemplates all nodes 102 being primary nodes (i.e., all nodes 102 may be directly accessible via all other nodes 102).

Returning to FIG. 1, nodes 102 may each include one or more processing modules 106 and one or more memory modules 108. Processing modules 106 may each include one or more microprocessors, controllers, or any other suitable computing devices or resources. Processing modules 106 may each work, either alone or with other components of system 100, to provide a portion or all of the functionality of system 100 described herein. Memory modules 108 may each take the form of volatile or non-volatile memory including, without limitation, magnetic media, optical media, random access memory (RAM), read-only memory (ROM), removable media, or any other suitable memory component.

Nodes 102 may each include a trust table 110. Trust tables 110 may be stored in memory module 108 or at any other suitable location within a node 102. The trust table 110 of a particular node 102 (e.g., primary node 102a) may store a trust level value for the particular node 102 (e.g., primary node 102a) as well as trust level values associated with each other node in system 100 (e.g., nodes 102b-102d). A stored trust level value associated with a particular node 102 may include any value indicative of the trustworthiness of the particular node 102. Additionally, the trust level value associated with a particular node 102 stored in a trust table 110 may be periodically updated, such as in response to the detection of a malicious attack on the particular node 102 (e.g., determined by a trust determination tool 112 of the particular node 102, as described below) or in response to the receipt of validated trust level associated with the particular node 102 (e.g., determined by a trust validation tool 114 of another node 102, as described in detail below).

Nodes 102 may each include a trust determination tool 112 and a trust validation tool 114. Trust determination tool 112 and trust validation tool 114 may each include any suitable combination of hardware, firmware, and software. Although functionality is described below as being associated with either trust determination tool 112 or trust validation tool 114, the functionality described below may be combined and provided by a single tool or divided among any suitable number of tools, according to particular needs.

Trust determination tools 112 of nodes 102 may be operable to monitor the activity of nodes 102 and periodically determine trust level values associated with the nodes 102. In certain embodiments, the trust determination tool 112 of a particular node 102 may be operable to detect malicious activity regarding the particular node 102. For example, trust determination tools 112 may include one or more intrusion detection systems operable to monitor events occurring in nodes 102 and analyze those events for signs of possible incidents that constitute violations or imminent threats of violation of certain security policies, acceptable use policies, or standard security practices associated with nodes 102. In response to the detection of such a violation, the trust determination tool 112 detecting the violation may determine a trust level value associated with its corresponding node 102 (the node 102 on which the trust determination tool 112 is stored) and update trust table 110 of its corresponding node 102. The trust determination tool 112 detecting the violation may communicate the determined trust level value to one or more other nodes 102 of system 100. The communication to one or more other nodes 102 may be triggered by the determination of the violation, by the expiration of a predetermined time interval, or by any other suitable event, according to particular needs.

As a particular example, trust determination tool 112c of secondary node 102c may determine that a malicious entity has taken control of node 102c. In response to such detection, trust determination tool 112c may determine a new trust level value (e.g., "Low") associated with secondary node 102c and update trust table 110c with the determined trust level value (e.g., by changing the trust level value of node 102c from "High" to "Low"). Additionally, trust determination tool 112c may communicate the determined trust level value (e.g., "Low") to one or more other nodes 102 in system 100. For example, node 102c may communicate the determined trust level value (e.g., "Low") to primary node 102b, and primary node 102b may update trust table 102b to reflect the received trust value.

Subsequently, trust table 110c of node 102c may be altered by the malicious entity that has taken control of node 102c (e.g., by modifying the trust level value for node 102c in trust table 110c back to "High") such that node 102c appears trustworthy to another node 102 with which node 102c may attempt to establish a communication session (as node 102c will send all or a part of trust table 110c, including the trust level value associated with node 102c, with the communication session request sent by node 102c). In other words, the trust level value associated with node 102c that accompanies the communication session request sent by node 102c may not be a reliable indicator of the trustworthiness of node 102c as that trust level value may have been modified by the malicious entity. Consequently, a node 102 receiving the communication request from node 102c (e.g., node 102d) may not be able to rely on the trust level value associated with node 102c that accompanies the communication session request sent by node 102c. Moreover, the node 102 receiving the communication request from node 102c (e.g., node 102d) may not have received the updated trust level value for node 102c determined by trust determination tool 112c (as discussed above). Consequently, the trust level value associated with node 102c stored in the trust table 110 of the node 102 receiving the communication session request from node 102c (e.g., node 102d) may not be a reliable indicator of the trustworthiness of node 102c. Accordingly, it may be appropriate for the node 102 receiving the communication session request from node 102c (e.g., node 102d) to determine a validated trust level may be determined in deciding whether to allow a requested communication session (as described in detail below).

Trust validation tools 114 of nodes 102 may each be operable to receive a request for a communication session from another node 102 of system 100 and, prior to determining whether to allow the request, determine a validated trust level associated with the requesting node 102. In determining a validated trust level associated with a node 102 requesting a communication session, the trust validation tool 114 of the node 102 receiving the request may access trust level values stored in trust tables 110 of one or more other nodes 102 in system 100 (i.e., nodes excluding the node 102 requesting the communications session).

For example, the trust validation tool 114 of the node 102 receiving the request may poll the remaining nodes 102 and receive responses from the polled nodes 102. The received responses may include all or a portion of the trust table 110 of the polled nodes 102 (including the trust level value of the node 102 requesting the communication session). The received trust tables 110 of the polled nodes 102 (or portions thereof) may then be stored and/or accessed by the trust validation tool 112 of the node 102 receiving the request in order to determine a validated trust level associated with the requesting node 102. In certain embodiments, the trust validation tool 114 of a particular node 102 receiving the request for the communication session may only poll the remaining nodes 102 if the amount of time since the trust table 110 of the particular node 102 was last updated is greater than a predetermined amount of time. Although trust validation tools 114 of nodes 102 are primarily described as accessing trust level values of other nodes 102 by polling those other nodes 102 and receiving responses that include the trust level values stored on those other nodes 102, trust validation tools 114 of nodes 102 may access trust level values of other nodes 102 by any suitable means from any suitable location within system 100, according to particular needs.

As a particular example, in the above-discussed scenario in which secondary node 102c (which has been compromised and is therefore untrustworthy) sends a request for a communication session to secondary node 102d, trust validation tool 114d of node 102d may receive the request for the communication session. In response to the received request, trust validation tool 114d may access (e.g., by polling and receiving responses, as discussed above) trust table 110a from primary node 102a and trust table 110b primary node 102b (via primary node 102a as secondary node 102d cannot communicate directly with primary node 102b because secondary node 102d is not located within communication boundary 116b). Additionally, the received request for the communication session may include trust table 110c of secondary node 102c (which has been compromised, as described above). As a result, secondary node 102d may access trust tables 110a-110c (received from nodes 102a-102c, respectively), each of which indicate a trust level value associated with requesting node 102c.

Trust validation tools 114, based on the received trust level value from the node 102 requesting the communication session and the accessed trust level values provided by other nodes 102 of system 100 for the node 102 requesting the communication session, may generate an overall trust topology that accounts for all of the received/accessed trust level values associated with the node 102 requesting the communication session. For example, in the above-described example in which secondary node 102d receives a communication request from secondary node 102c, trust validation application 114d may generate an overall trust topology accounting for the trust level value received from node 102c as well as the trust level values received from primary nodes 102a and 102b.

In certain embodiments, trust validation tools 114 may generate the overall trust topology by applying a voting technique accounting for the received trust level values. For example, the voting technique may comprise a "3m+1" solution to a Byzantine Generals Problem, where "m" is the number of compromised nodes. Such a solution assumes that majority rules where the number of nodes 102 in system 100 is greater than the total of "3m+1" (with "m" being the number of compromised nodes). For example, if one node is known to be compromised, a node 102 receiving a communication session request may determine that the validated trust level is equal to the trust level reflected in a majority of the accessed trust level values so long as system 100 includes four or more nodes. In other words, if a majority of trust level values accessed by a node 102 receiving a communication session request indicate that the trust level value of the requesting node 102 is "High," the trust validation tool 114 of the node 102 receiving the request may determine a validated trust level of "High." Conversely, if a majority of trust level values accessed by a node 102 receiving a communication session request indicate that the trust level value of the requesting node 102 is "Low," the trust validation tool 114 of the node 102 receiving the request may determine a validated trust level of "Low."

As a particular example, in the above-discussed example in which node 102c (which has been compromised and is therefore untrustworthy) sends a request for a communication session to secondary node 102d, trust validation application 114d in part may apply the following steps to determine a validated trust level (e.g., "High" or "Low") associated with request node 102c:

---

[If $T_{C\_Time\_Since\_Last\_Update}$ > Update_Threshold]
    [Node 102c requests $T_A$]
    [Node 102c requests $T_B$]
    [If $T_A == T_B$]
        [If $T_{A(TLVc)}$ != $T_{C(TLVc(compromised))}$]
            [Allow communication session with node 102c]
        [Else]
            [Update System Topology]
            [Do not allow communication session with node 102c]
        [End If]
    [End If]
[Else]
    [Node 102a sends $T_A$ to node 102d]

where:
$T_A$ = Trust table of node 102a
$T_B$ = Trust table of node 102b
$T_C$ = Trust table of node 102c
$T_{A(TLVc)}$ = Trust level value of node 102c as reflected in the trust table of node 102a
$T_{C(TLVc(compromised))}$ = Trust level value of node 102c as reflected in the compromised trust table received from node 102c
$T_{C\_Time\_Since\_Last\_Update}$ = Amount of time since last update of trust level values of trust table 110c
Update_Threshold = Predefined amount of time

---

Trust validation tools 114 may each be operable to determine whether to allow a requested communication session based on the determined validated trust level. For example, if the determined validated trust level is "High," a trust validation tool 114 may decide to allow the requested communication session. Conversely, if the determined validated trust level is "Low," a trust validation tool 114 may decide to deny a requested communication session. Additionally, trust validation tools 114 may be operable to communicate (automatically or in any other suitable manner) the determined validated trust level associated with a node 102 requesting a communications session to other nodes 102 of system 100 such that the trust tables 110 of the other nodes 102 may be updated, thereby isolating the node 102 requesting the communications session in situations where the validated trust level indicates that the node 102 requesting the communication session is untrustworthy.

Although the voting technique applied by trust validation tools 114 is primarily described as being a "3m+1" solution to a Byzantine Generals Problem, the present disclosure contemplates the application of any suitable voting technique taking into account the accessed trust level values associated with a requesting node 102. Furthermore, although the trust level values determined by trust determination tools 112 are described as being either "High" or "Low," the present disclosure contemplates the determined trust level values as including any suitable indicator of trustworthiness of a node 102. As one particular example, the determined trust level values by comprise numerical values (e.g., 1-10) according to which the trustworthiness of a node is rated (e.g., 1 being the most trustworthy and 10 being the least trustworthy).

Certain embodiments of the present disclosure may provide one or more technical advantages. For example, the trust determination tool of a node receiving a communication request may determine whether to allow the requested communication session based on a validated trust level associated with the requesting node. Because the validated trust level is determined based on trust level values obtained from each of the other nodes in the network, the validated trust level may be a more reliable indicator of the trustworthiness of the requesting node. As a result, the ability to compromise the security of the network through a single node may be reduced or eliminated. Furthermore, each node of the ad hoc network may be independently operable to perform the above-discussed trust validation procedure, which may reduce or eliminate the need for a centralized management structure for determining whether to allow requested communication sessions.

Figure 3:
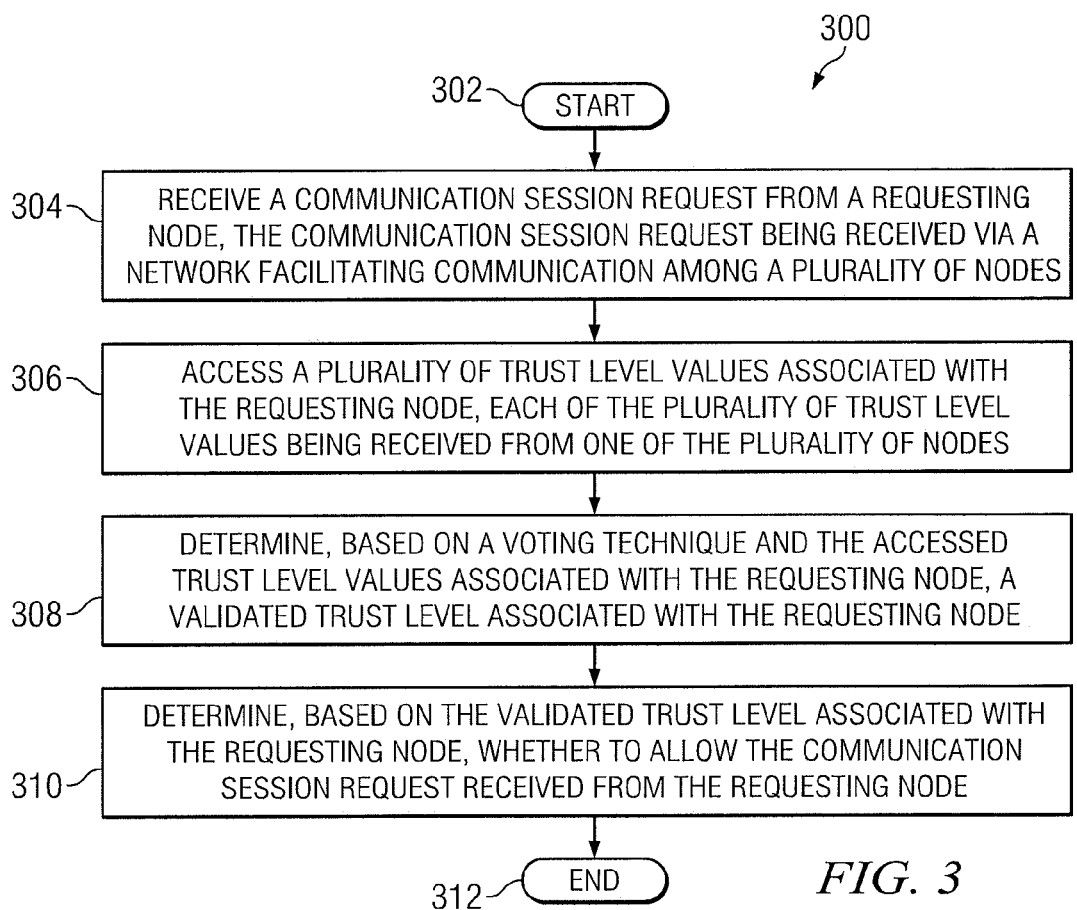
FIG. 3 illustrates an example method for providing network security using trust validation, according to certain embodiments of the present disclosure.

FIG. 3 illustrates an example method 300 for providing network security using trust validation, according to certain embodiments of the present disclosure. Although the example method 300 depicted in FIG. 3 is described below in the context of secondary node 102d receiving a communication session request from secondary node 102c for illustrative purposes, the present disclosure contemplates that example method 300 may be applied by any suitable node 102 in response to a request for communication from any other suitable node 102.

The method begins at step 302. At step 304, trust validation tool 114d of secondary node 102d receives, via network 104, a communication session request from secondary node 102c. At step 306, trust validation tool 114d accesses a plurality of trust level values associated with secondary node 102c from the other nodes 102 of system 100 (i.e., primary nodes 102a and 102b). In certain embodiments, trust validation tool 114d may poll primary nodes 102a and 102b (e.g., by requesting trust tables 110a and 110b from nodes 102a and 102b, respectively). In response, primary nodes 102a and 102b may communicate trust level values associated with secondary node 102c, and trust determination tool 114d may access (i.e., receive) these communicated trust level values.

At step 308, trust validation tool 114d determines, based on a voting technique and the accessed trust level values associated with the secondary node 102c, a validated trust level associated with secondary node 102c. In certain embodiments, trust validation tool 114d may generate an overall trust topology by applying a voting technique accounting for the received trust values that comprises a "3m+1" solution to a Byzantine generals problem, where "m" constitutes the number of compromised nodes 102. Such a solution assumes that majority rule where the number of nodes 102 in system 100 is greater than the total of "3m+1" (with "m" being the number of compromised nodes). In other words, if a majority of trust level values accessed by a node 102 receiving a communication session request indicate that the trust level value of the requesting node 102 is "High" (assuming a number of nodes greater than or equal to "3m+1"), trust validation tool 114d of the node 102 r may determine a validated trust level associated with secondary node 102c of "High." Conversely, if a majority of trust level values accessed by a node 102 receiving a communication session request indicate that the trust level value of the requesting node 102 is "Low," (assuming a number of nodes greater than or equal to "3m+1"), trust validation tool 114d determine a validated trust level associated with secondary node 102c of "Low."

At step 310, trust validation tool 114d determines, based on the determined validated trust level associated with secondary node 102c, whether to allow the communication session request received from secondary node 102c. For example, if the determined validated trust level associated with secondary node 102c is "High," trust validation tool 114d may decide to allow the requested communication session. Conversely, if the determined validated trust level associated with secondary node 102c is "Low," trust validation tool 114d may decide to deny a requested communication session. The method ends at step 312.

Although the steps of method 300 have been described as being performed in a particular order, the present disclosure contemplates that the steps of method 300 may be performed in any suitable order, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method, comprising:

receiving a first communication session request from a first requesting node, the communication session request being received by a first node of a plurality of nodes via a network facilitating communication among the plurality of nodes, wherein each of the plurality of nodes comprises a respective trust table comprising trust level values for a plurality of nodes of the network, and wherein the first communication session request includes a first trust level value associated with the first requesting node;

determining a first amount of time since a trust table of the first node was last updated, and determining that the first amount of time since the trust table of the first node was last updated is greater than a predetermined amount of time;

based on determining that the first amount of time since the trust table of the first node was last updated is greater than the predetermined amount of time:

accessing a plurality of trust level values associated with the first requesting node, each of the plurality of trust level values being received from a respective trust table located at a respective node of the plurality of nodes; and determining, based on a voting technique and the plurality of accessed trust level values associated with the requesting node, a first validated trust level associated with the first requesting node by the first node;

determining, based on the first validated trust level associated with the first requesting node and the first trust level value included in the first communication session request, whether to allow the first communication session request received from the first requesting node by the first node;

receiving a second communication session request from a second requesting node by the first node, wherein the second communication session request includes a second trust level value associated with the second requesting node;

determining a second amount of time since a trust table of the first node was last updated, and determining that the second amount of time since the trust table of the first node was last updated is less than a predetermined amount of time;

based on determining that the second amount of time since the trust table of the first node was last updated is less than the predetermined amount of time, determining a second validated trust level associated with the second requesting node based on only a trust level value associated with the second requesting node from a trust table in the first node by the first node; and determining, based on the second validated trust level associated with the second requesting node and the second trust level value included in the second communication session request, whether to allow the second communication session request received from the second requesting node by the first node.

2. The method of claim 1, wherein the network facilitating communication among a plurality of nodes comprises a wireless ad hoc network.

3. The method of claim 1, wherein: the plurality of nodes include one or more primary nodes; and the plurality of nodes include one or more secondary nodes, the one or more secondary nodes being operable to communicate with one another via at least one primary node.

4. The method of claim 1, wherein the voting technique comprises the application of a 3m+1 solution, wherein "m" defines a quantity of potentially compromised nodes.

5. The method of claim 1, wherein determining whether to allow the first communication session request received from the first requesting comprises:

based on determining that the first validated trust level associated with the first requesting node differs from the first trust level value included in the first communication session request denying the first communication session request.

6. The method of claim 5, comprising communicating the first validated trust level to one or more of plurality of nodes in response to the determination that the first validated trust level value associated with the first requesting node differs from the first trust level included in the first communication session request.

7. The method of claim 1, wherein determining whether to allow the first communication session request received from the first requesting comprises:

based on determining that the first validated trust level associated with the first requesting node is the same as the first trust level value included in the first communication session request allowing the first communication session request.

8. A system, comprising: one or more hardware processors to perform the steps of:

receive a first communication session request from a first requesting node, the communication session request being received by a first node of a plurality of nodes via a network facilitating communication among the plurality of nodes, wherein each of the plurality of nodes comprises a respective trust table comprising trust level values for a plurality of nodes of the network, and wherein the first communication session request includes a first trust level value associated with the first requesting node;

determine a first amount of time since a trust table of the first node was last updated, and determine that the first amount of time since the trust table of the first node was last updated is greater than a predetermined amount of time;

based on determining that the first amount of time since the trust table of the first node was last updated is greater than the predetermined amount of time:

access a plurality of trust level values associated with the first requesting node, each of the plurality of trust level values being received from a respective trust table located at a respective node of the plurality of nodes; and determine, based on a voting technique and the plurality of accessed trust level values associated with the requesting node, a first validated trust level associated with the first requesting node by the first node; and determine, based on the first validated trust level associated with the first requesting node and the first trust level value included in the first communication session request, whether to allow the first communication session request received from the first requesting node by the first node;

receive a second communication session request from a second requesting node by the first node, wherein the second communication session request includes a second trust level value associated with the second requesting node;

determine a second amount of time since a trust table of the first node was last updated, and determine that the second amount of time since the trust table of the first node was last updated is less than a predetermined amount of time;

based on determining that the second amount of time since the trust table of the first node was last updated is less than the predetermined amount of time, determine a second validated trust level associated with the second requesting node based on only a trust level value associated with the second requesting node from a trust table in the first node by the first node; and determine, based on the second validated trust level associated with the second requesting node and the second trust level value included in the second communication session request, whether to allow the second communication session request received from the second requesting node by the first node.

9. The system of claim 1, wherein the network facilitating communication among a plurality of nodes comprises a wireless ad hoc network.

10. The system of claim 1, wherein: the plurality of nodes include one or more primary nodes; and the plurality of nodes include one or more secondary nodes, the one or more secondary nodes being operable to communicate with one another via at least one primary node.

11. The system of claim 1, wherein the voting technique comprises the application of a 3m+1 solution, wherein "m" defines a quantity of potentially compromised nodes.

12. The system of claim 1, wherein determining whether to allow the first communication session request received from the first requesting comprises:
based on determining that the first validated trust level associated with the first requesting node differs from the first trust level value included in the first communication session request denying the first communication session request.

13. The method of claim 5, wherein the one or more processing units are operable to communicate the first validated trust level to one or more of plurality of nodes in response to the determination that the first validated trust level value associated with the first requesting node differs from the first trust level included in the first communication session request.

14. The system of claim 1, wherein determining whether to allow the first communication session request received from the first requesting comprises:
based on determining that the first validated trust level associated with the first requesting node is the same as the first trust level value included in the first communication session request allowing the first communication session request.

15. A non-transitory computer-readable medium encoded with software, the software operable when executed to perform operation comprising:
receiving a first communication session request from a first requesting node, the communication session request being received by a first node of a plurality of nodes via a network facilitating communication among the plurality of nodes, wherein each of the plurality of nodes comprises a respective trust table comprising trust level values for a plurality of nodes of the network, and wherein the first communication session request includes a first trust level value associated with the first requesting node;
determining a first amount of time since a trust table of the first node was last updated, and determining that the first amount of time since the trust table of the first node was last updated is greater than a predetermined amount of time;
based on determining that the first amount of time since the trust table of the first node was last updated is greater than the predetermined amount of time:
accessing a plurality of trust level values associated with the first requesting node, each of the plurality of trust level values being received from a respective trust table located at a respective node of the plurality of nodes; and
determining, based on a voting technique and the plurality of accessed trust level values associated with the requesting node, a first validated trust level associated with the first requesting node by the first node;
determining, based on the first validated trust level associated with the first requesting node and the first trust level value included in the first communication session request, whether to allow the first communication session request received from the first requesting node by the first node;
receiving a second communication session request from a second requesting node by the first node, wherein the second communication session request includes a second trust level value associated with the second requesting node;
determining a second amount of time since a trust table of the first node was last updated, and determining that the second amount of time since the trust table of the first node was last updated is less than a predetermined amount of time;
based on determining that the second amount of time since the trust table of the first node was last updated is less than the predetermined amount of time, determining a second validated trust level associated with the second requesting node based on only a trust level value associated with the second requesting node from a trust table in the first node by the first node; and
determining, based on the second validated trust level associated with the second requesting node and the second trust level value included in the second communication session request, whether to allow the second communication session request received from the second requesting node by the first node.

16. The software of claim 15, wherein the network facilitating communication among a plurality of nodes comprises a wireless ad hoc network.

17. The software of claim 15, wherein: the plurality of nodes include one or more primary nodes; and the plurality of nodes include one or more secondary nodes, the one or more secondary nodes being operable to communicate with one another via at least one primary node.

18. The method of claim 15, wherein the voting technique comprises the application of a 3m+1 solution, wherein "m" defines the quantity of potential compromised nodes.

19. The software of claim 15, wherein determining whether to allow the first communication session request received from the first requesting comprises:
based on determining that the first validated trust level associated with the first requesting node differs from the first trust level value included in the first communication session request denying the first communication session request.

20. The software of claim 19, comprising communicating the first validated trust level to one or more of plurality of nodes in response to the determination that the first validated trust level value associated with the first requesting node differs from the first trust level included in the first communication session request.

21. The software of claim 15, wherein determining whether to allow the first communication session request received from the first requesting comprises:
based on determining that the first validated trust level associated with the first requesting node is the same as the first trust level value included in the first communication session request allowing the first communication session request.

* * * * *